US006872570B2

(12) United States Patent
Köhn

(10) Patent No.: US 6,872,570 B2
(45) Date of Patent: Mar. 29, 2005

(54) LABORATORY METHOD FOR TEMPERING REACTION SAMPLES

(75) Inventor: Heinz Gerhard Köhn, Hamburg (DE)

(73) Assignee: Eppendorf AG, Hamburg (DE)

( * ) Notice: Subject to any disclaimer, the term of this patent is extended or adjusted under 35 U.S.C. 154(b) by 474 days.

(21) Appl. No.: 10/015,000

(22) Filed: Dec. 11, 2001

(65) Prior Publication Data

US 2003/0096396 A1 May 22, 2003

(30) Foreign Application Priority Data

Dec. 12, 2000 (DE) ........................................ 100 62 890

(51) Int. Cl.$^{7}$ ................................................ G01N 25/00

(52) U.S. Cl. ......................... 436/43; 436/157; 436/174; 422/50; 422/68.1

(58) Field of Search ............................ 436/43, 47, 157, 436/174; 422/50, 62, 68.1, 99, 109; 165/201, 203, 267

(56) References Cited

U.S. PATENT DOCUMENTS 3,801,467 A * 4/1974 Nobe et al. ................. 165/206
5,240,857 A * 8/1993 Lahetkangas ............ 435/303.1
5,255,976 A * 10/1993 Connelly ..................... 374/31
5,779,981 A * 7/1998 Danssaert et al. ............ 422/99
6,054,263 A * 4/2000 Danssaert et al. ............. 435/4

* cited by examiner

*Primary Examiner*—Jeffrey R. Snay
(74) *Attorney, Agent, or Firm*—Sidley Austin Brown & Wood, LLP

(57) ABSTRACT

A laboratory device for jointly tempering reaction samples in at least two steps in respectively assigned, specified temperature ranges, which are carried out repeatedly and consecutively as sequences of steps, the laboratory tempering device, in one step of the sequences of steps, bringing several groups of samples, in each case containing at least one sample, to temperatures within the temperature range, which are constant within the groups and different between the groups, wherein the laboratory tempering device, in each step of the sequence, brings a different partial amount of the samples in groups to temperatures, which are the same within the groups and different between the groups, and brings the samples of the other partial amounts to a same temperature within the assigned temperature range.

3 Claims, 1 Drawing Sheet

LABORATORY METHOD FOR TEMPERING REACTION SAMPLES

FIELD OF INVENTION

Figure 1:
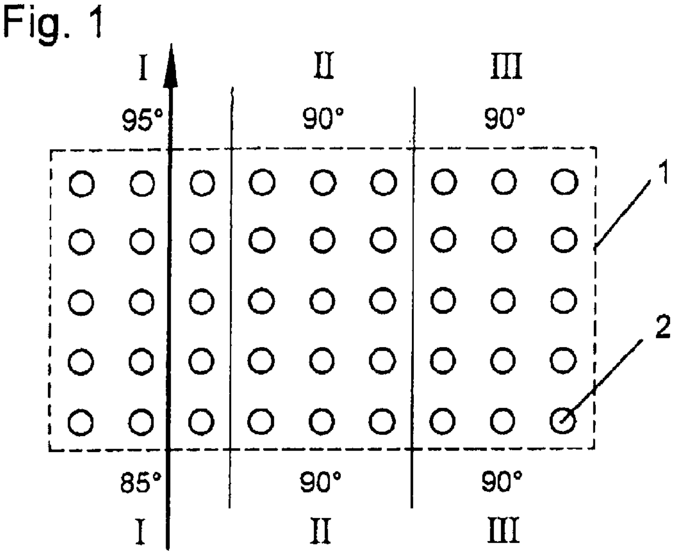

The invention relates to a laboratory tempering device for the cyclic tempering of reaction samples.

BACKGROUND INFORMATION AND PRIOR ART

Such laboratory tempering devices are used for the cyclic tempering of reaction samples to different temperatures, as required for example, for carrying out some biochemical reactions. PCR (polymerase chain reaction) is one of the main areas of application of such tempering devices. If the optimum temperatures of the respective temperature areas are known, a large number of samples may be processed in one pass of several cycles even for large-scale throughputs. The expression "pass" is understood to be a closed reaction pass in which the sequence of steps was repeated several times. However, the optimum temperatures of the individual temperature areas must be determined before large-scale through-puts are possible.

Laboratory tempering devices, as known, for example, from U.S. Pat. No. 6,054,263 and DE 196 46 115 A1, bring all samples to different temperatures within the assigned temperature area in one step of the cyclically repeated sequence of steps. When the reaction results are evaluated, it is possible to ascertain the samples for which an optimum result is obtained in a step. This is then the optimum temperature for such step.

In conventional commercial, laboratory tempering devices, the samples are disposed in rows and columns in a two-dimensional array. The temperature differences are applied as a gradient in one direction over the array. The sequence of steps is repeated cyclically. In the case of these so-called gradient cycles, different temperatures are employed only for the same step during each cyclically repeated sequence of steps. Therefore, only the temperature for one step can be optimized in one pass and several passes are required for optimizing the temperatures of all steps. This is associated with the expenditure of much time and the consumption of expensive samples.

It has been proposed in DE 196 46 115 A1 to apply gradients in the X and Y directions in two steps in each sequence of steps. With that, two steps can be optimized in each pass. However, if the sequence of steps consists of more steps, such as the conventional three steps of the standard PCR process, then the further steps must be optimized in separated passes. In addition, for designing gradients in different directions, increased expenditures for equipment and evaluation is required.

OBJECT OF THE INVENTION

It is an object of the present invention to simplify the temperature optimization of all steps in the case of a laboratory tempering device.

SUMMARY OF THE INVENTION

This objective is accomplished by the distinguishing features of claim 1.

Pursuant to the invention, the samples, provided in the laboratory tempering device, are divided into partial amounts, which are assigned in each case to one of the steps. For each step, temperature differences are applied to only one of the partial amounts and all remaining samples are at one of the temperatures of the area assigned to the step. The whole is repeated cyclically. If one of the partial amounts is selected and considered during the consecutive steps, it is subjected to temperature differences only in the same step. When the samples are evaluated after the pass is completed, the optimum temperature for one of the steps can be determined at each of the partial amounts by evaluating the results for the different groups. This partial amount remains unaffected by temperature differences in other steps. A very simple and accurate determination of the optimum temperature for each step therefore results. All steps can be optimized with respect to temperature in one pass.

The samples may be disposed in any manner, two-dimensionally or three-dimensionally or also randomly. A computer can be employed to assign and evaluate the groups and partial amounts. At the same time, the advantage arises that, for any number of steps per sequence, the temperature optimization for all steps can always take place in one pass by dividing the samples into an appropriate number of partial amounts.

According to the teaching of the DE 196 46 115 A1, the simultaneous optimization of only two steps would be possible in a two-dimensional arrangement of samples. Similarly, in three-dimensions arrangement of samples, it would be possible to optimize three steps in one pass. With the present invention, the number of steps that can be optimized simultaneously is independent of the number of dimensions in which the samples are arranged.

Advantageously, for simplifying the arrangement and evaluating the samples, the distinguishing features are provided and, for the further simplification, the distinguishing features are provided. Moreover, the partial amounts are advantageously disposed, in an easily surveyed manner and gradients are applied advantageously. This results in an arrangement which corresponds essentially to that of the usual gradient cycler, for which however, pursuant to the invention, the areas of the array are treated differently for each step. When the conventional thermally conducting tempering block is used which accommodates the samples, this can be made possible, for example, by appropriate thermal division at the area boundaries.

A further simplification of the design and also of the evaluation arises from the advantageous distinguishing features.

Figure 2:
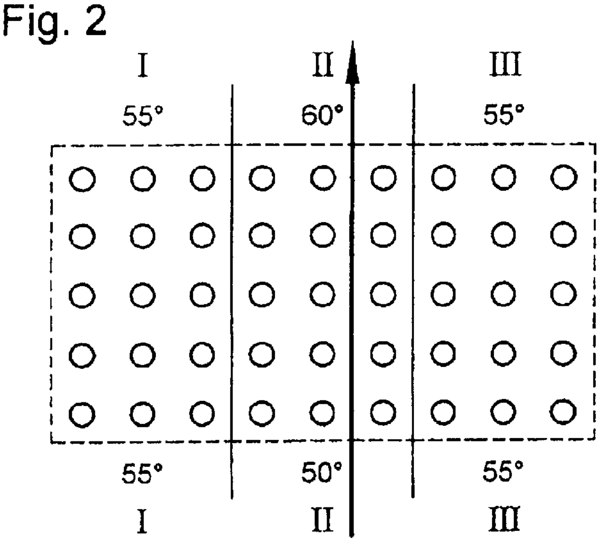
Figure 3:
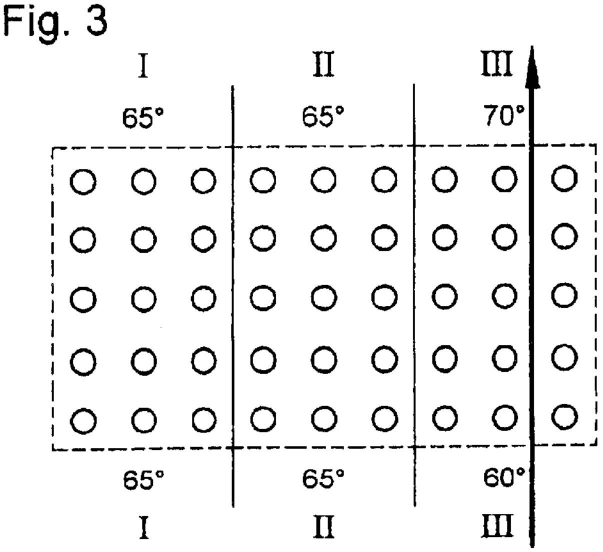

The invention is shown by way of example and diagrammatically in the drawing, in which FIG. 1 shows a laboratory tempering device with a two-dimensional arrangement of samples while carrying out the first step of a three-step sequence, FIG. 2 shows the arrangement of FIG. 1 during a second step and FIG. 3 shows the arrangement of FIG. 1 during a third step of the sequence.

FIG. 1 shows a laboratory tempering device 1, which contains reaction samples 2, which are arranged in rows and columns in an array. In the example shown, a three-step PCR process is to be carried out on the samples. Moreover, all samples of the array are to be brought to the denaturing step, that is, to temperatures in the temperature range around 90° C., in the first step. In the second step, which is the annealing step, shown in FIG. 2, all samples are brought to the temperature range around 45° C. In the third step, which is the elongation step shown in FIG. 3, all samples are brought to a temperature range around 65° C.

The samples of the array, shown in FIG. 1 are divided into three partial amounts, corresponding to the areas I, II, III and, moreover, in the simple manner shown, with the two range boundaries shown, which lie parallel to the rows of the array. The sample uses PCR as its example.

In the denaturing step, shown in FIG. 1, the laboratory tempering device 1, with tempering devices not shown, brings the areas II and III to the average temperature of 90° C. of the temperature range. In area I, a temperature gradient is applied in the direction of the arrow, that is, in the direction of the columns, and produces temperatures ranging from 85° to 95° C. in this gradient.

In the second step, the annealing step, which is shown in FIG. 2, a gradient, indicated by an arrow, is also applied parallel to the columns. In this case, however, it is applied to area II. Areas I and III are at the average temperature of 55° C. of the temperature range belonging to the annealing step.

In the elongation step, shown in FIG. 3, a temperature gradient is applied in area III, as shown. The two areas I and II once again are at the average temperate of the associated temperature range, that is at 65° C.

The three steps shown are repeated cyclically, as a sequence of steps, in one pass. In one sequence of steps, the gradient travels from step to step through the areas I to III.

At the end of the pass, the reaction results are evaluated in the samples. The temperature, at which the denaturation step is optimal, can be ascertained from the samples in area I. Correspondingly, the optimum temperature for the annealing step and the elongation step can be determined from the samples of regions II and III. All three steps can therefore be optimized with respect to their temperature in one pass.

If a process requiring only two steps is employed, only two areas would be required, that is areas I and II. If a process with five steps is used, the array would have to be divided into five regions, which should be treated in the manner shown in FIGS. 1 to 3.

The gradients need not necessarily be applied in the direction of columns, as they are in the example shown. They can also be applied in the direction of the rows. However, the embodiment shown, for which the gradients are parallel to the boundaries of the area III, is structurally simpler, since the gradients can be generated from two sides of the array arrangement (in FIG. 1 from the top and from the bottom) for all three areas I to III.

If the laboratory tempering device is constructed as a conventional, thermally conductive block with depressions, in which the reaction samples 2, are disposed, for example, in plastic containers, a clean, thermal separation between the areas would have to be assured at the area boundaries.

The problems of area boundaries do not exist when the reaction samples 2 are tempered individually and independently of one another with devices that are not shown. The arrangement of columns and rows can then also be given up in favor of a random arrangement of the reaction samples 2 in the area of the array. If, for example, the step of FIG. 1 is to be carried out, a number of randomly taken groups is formed in a partial amount, taken at random from the samples 2. These groups of samples are brought to different temperatures, while all remaining samples remain at the same temperature.

The groups, brought within a partial amount to different temperatures, must in each case contain at least one sample. In the sample case, the array arrangement shown in FIG. 1 could contain only one column, occupied with samples, per area (I, III, III). By these means, the consumption of samples during the temperature optimization pass is reduced. If several columns per area are provided, as shown, this laboratory tempering device can also be used later on for the large-scale processing of large numbers of samples, for which the optimum temperatures of the individual steps are known and, therefore, in each of the steps shown in FIGS. 1 to 3, all samples are at the optimum temperature of this step, which has been determined previously.

In the aforementioned embodiments, the samples are arranged in a two-dimensional array. Pursuant to the invention, the samples can also be arranged three-dimensionally, for example, in a rectangular lattice, or also irregularly. The aforementioned directions would then apply analogously to the form expanded to three dimensions.

What is claimed is:

1. A method of repeated tempering of samples in a plurality of successive steps, comprising the steps of:

providing a laboratory tempering device comprising a plurality of sample receptacles arranged in a two-dimensional array formed of rows and columns, wherein the array is divided in a plurality of areas corresponding in number to the number of successive steps, each area having at least one column and being capable of producing either a temperature gradient in the direction of the column or a uniform temperature;

successively tempering the samples in the array at the respective different predetermined temperatures of the successive steps, with the gradient in each successive step being produced in a different one of the areas;

repeating the successive steps.

2. A method according to claim 1, wherein the rows and columns are disposed orthogonally to each other.

3. A method according to claim 2, wherein boundaries of the areas extended parallel to the direction of the temperature gradient.

* * * * *